UNITED STATES PATENT OFFICE.

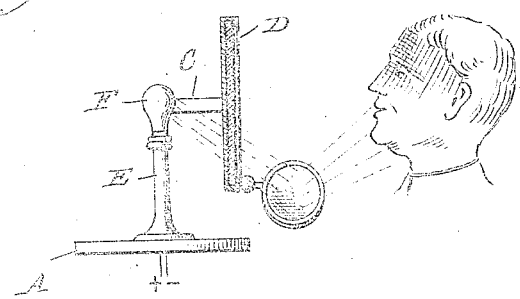
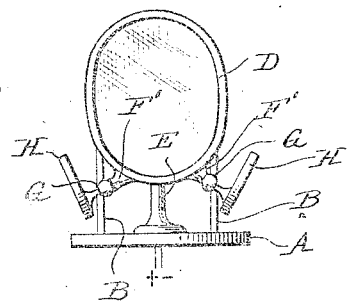
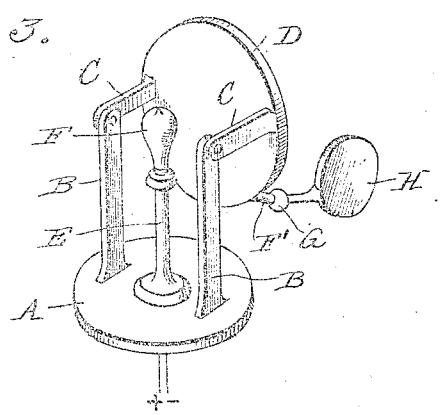

HOLGER VARDER, OF NEW YORK, N. Y.

MIRROR.

940,411. Specification of Letters Patent. Patented Nov. 16, 1909.

Application filed May 28, 1908. Serial No. 435,395.

*To all whom it may concern:*

Be it known that I, HOLGER VARDER, a subject of the King of Denmark, and resident of New York, in the county and State of New York, have invented certain new and useful Improvements in Mirrors, of which the following is a specification.

The invention relates to improvements in mirrors such as are used for shaving purposes and it has for its object the provision of a device whereby the light can be concentrated on the cheeks of the user without shining in his eyes.

It consists in the novel construction, combination and arrangement of parts hereinafter fully described, pointed out in the accompanying claims and illustrated in the accompanying drawings.

In the drawings, in which similar reference characters designate corresponding parts, Figure 1 is a side elevation, partly in section, of a device embodying the invention. Fig. 2 is a front elevation. Fig. 3 is a perspective view.

The stand A on which the device is mounted is a flat disk adapted to rest on a table, shelf or other suitable support. It is of sufficient size and weight to hold the device against accidental displacement. Fixed on the stand are the uprights B to the upper ends of which are hinged the arms C carrying at their free ends the mirror D. By means of the hinged connection between the arms and the uprights a vertical adjustment of the mirror can be secured to accommodate the height of the user.

On the stand A back of the main mirror and between the uprights B is the standard E carrying at its upper end the electric lamp F, which may be connected with any suitable source of electricity by wires leading through the standard. The lamp is in line with the joints between the uprights B and the arms C and is back of the central part of the main mirror. When the mirror is adjusted vertically on its hinged connections it will always be between the lamp and the face of the person looking into the glass so that the light from the lamp cannot shine directly into his eyes. On the lower part of the casing of the main mirror D are the arms F' having ball-and-socket joints G intermediate of their ends. These arms project from opposite sides of the main mirror and carry at their extremities the auxiliary mirrors H. By means of the ball-and-socket joints the auxiliary mirrors can be adjusted to reflect the light from the lamp F back of the main mirror upon both sides of the face of the person looking into the glass of the main mirror.

While the device has been shown and described as being provided with an electric lamp, yet it is obvious that other lamps can be used. Also, instead of being mounted on a stand the device can be mounted on a wall-bracket.

Having thus described my invention, what I claim and desire to secure by Letters Patent is:

1. In a mirror, a stand, the main mirror hinged to said stand, a lamp fast on said stand back of the main mirror in line with the hinge-connection between the main mirror and the stand, and auxiliary mirrors at the side of the main mirror to deflect the light from said lamp to the front of the main mirror.

2. In a mirror, a stand, uprights on said stand, arms hinged to said uprights, the main mirror carried by said arms, a lamp fast on said stand back of said main mirror in line with the joints between the arms and uprights, and auxiliary mirrors adjustably mounted on said main mirror to deflect the light from the lamp to the front of the main mirror.

3. In a mirror, a stand, the main mirror adjustably mounted on said stand, a lamp mounted on said stand back of said mirror in the center of movement of the mirror, and auxiliary mirrors adjustable on said main mirror to deflect the light from the lamp to the front of the main mirror.

4. In a mirror, a stand, uprights on said stand, arms hinged to the upper ends of said uprights, the main mirror carried at the free ends of said arms, a lamp mounted on said stand back of said mirror between the hinged connections between the uprights and arms, arms projecting from the front of the mirror, ball-and-socket joints in said arms, and auxiliary mirrors carried at the extremities of the latter arms.

In testimony whereof I hereunto affix my signature in the presence of two witnesses.

HOLGER VARDER.

Witnesses:
H. A. BENNETT,
NORMAN GRANT.